July 30, 1940.  B. W. DENNIS  2,209,325

FLEXIBLE COUPLING

Filed March 2, 1937

Basil W. Dennis — INVENTOR.

BY Green & McCallister
His ATTORNEYS.

Patented July 30, 1940

2,209,325

UNITED STATES PATENT OFFICE 2,209,325

FLEXIBLE COUPLING

Basil W. Dennis, Pittsburgh, Pa., assignor to Perfect Bond Asphalt Company, Baltimore, Md.

Application March 2, 1937, Serial No. 128,613

6 Claims. (Cl. 285—90)

This invention relates to couplings, and more particularly to improvements in flexible couplings and the method of making the same, and is especially directed to the production of a simple, inexpensive coupling which may be readily applied to conduits to join them together and permit relative movement between them, and is a continuation-in-part of application Serial No. 699,006, filed by me on November 21, 1933.

The primary object of the present invention is to provide a flexible coupling which can be easily attached to plain end conduits. The latter may be the usual and customary fixed pipes of plant equipment or those used in extended pipe lines, or the conduits may be in the form of hollow shafts employed both to transmit power and convey fluid. Accordingly, whenever the term "conduit" is hereinafter used, it is to be understood as embracing both fixed pipes and rotatable hollow shafts.

It is a further object of this invention to employ, as a flexible element of the coupling, annular diaphragm plates which can be made from annealed rolled stock, such as two or more plates attached directly to the conduit ends, or from the present standard flange couplings, such as half of a Van Stone flange coupling, by milling or grooving, or by forming the flange thereof to produce the diaphragm plates and the couplings thus formed may be attached either to the sides of the conduits or butt welded to the ends of the conduits.

A still further object of the invention is to provide a coupling in which means are provided for sealing out sediment from between the diaphragm plates and for forming a guide to prevent the piping strains from being transmitted to the diaphragm of the coupling.

A still further object of this invention is to provide flexible couplings which can be readily installed in the field in much the same manner as the ordinary pipe coupling and when once installed eliminates the need for inspection or renewal since there are no gaskets or the like used with the coupling. Such couplings permit the conduits to approach one another, to separate, and to tilt somewhat without affecting the permanent tightness of the coupling.

These and other objects which will hereinafter be made apparent to those skilled in this particular art are accomplished by means of this invention, certain exemplifications of which are described in the following specification and illustrated in the accompanying drawing, wherein Figure 1 is a longitudinal section showing a flexible coupling illustrating one exemplification of my invention;

Figure 1:
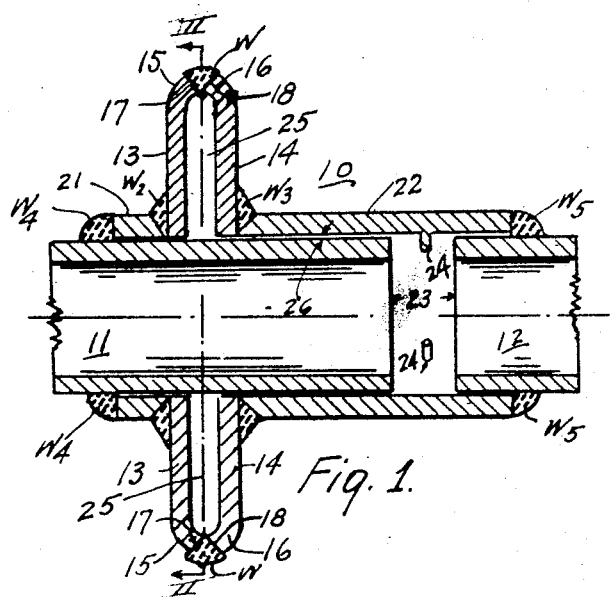
Figure 2:
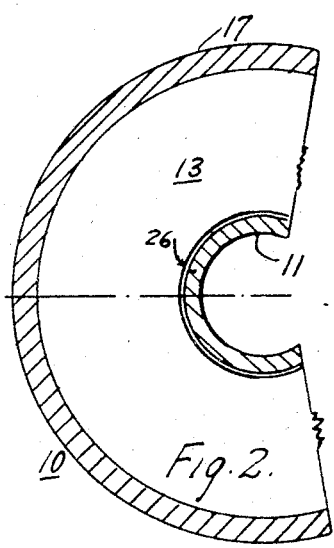
Fig. 2 is a sectional view taken on the line II—II of Fig. 1 and having a portion thereof broken away for convenience of illustration.

Referring now more particularly to the drawing, and especially to Figs. 1 and 2, a flexible coupling 10 embodying my invention is illustrated for joining the adjacent ends of conduits 11 and 12. The coupling 10 comprises a pair of annular diaphragm plates 13 and 14 formed from suitable rolled stock, stainless steel or other rust-resisting metal, by punching the plates from the stock or by subjecting the stock to a combined punching and forming operation. Each of the plates 13 and 14 has its outer edge 15 and 16, respectively, turned over so that the edge faces 17 and 18, respectively, of the plates are disposed at an angle of substantially 45° to the plane of their respective plates. It should be noted that the edge 16 on the plate 14 is bent in a reverse direction from the edge 15 on the plate 13 so that when the plates are assembled (Fig. 1), the inner edges of the faces 17 and 18 abut against each other forming a V-shaped groove and the flexible section of the coupling is produced by welding the outer edges of the plates together, as at W, thus filling the grooves with weld metal. The fabrication of the coupling is completed by welding a sleeve member 21 to the inner edge of the plate 13 at W2 and a sleeve member 22 to the inner edge of the plate 14, at W3. The sleeve member 22 is of appreciably longer length than the sleeve 21 so that when the coupling 10 is positioned over the ends of the conduits 11—12, it extends over the space 23 between the ends of the conduits, and the sleeve is provided, on its inner surface, with inwardly projecting lugs 24 for ensuring positioning of the coupling 10 between the ends of said conduits.

To join the conduits with my improved coupling member 10, the sleeve 21 is slipped over the end of the conduit 11 and the coupling is moved toward the other end of that conduit until the lugs 24 on the sleeve 22 come into engagement with the end of the conduit 11. The end of the conduit 12 is then inserted in the sleeve 22. Coupling 10 is then moved to center the lugs 24 in the space 23 between the ends of the conduits 11 and 12 and this is accomplished by making a mark on the conduit 11 at the end of the sleeve 21 when the lugs 24 are in engagement with the end of that conduit and then moving the coupling toward the conduit 12 until the lugs 24 engage the end of the conduit 12 when the position of the sleeve 21 on the conduit 11 is again marked. The center is completed by moving the coupling until the end of the sleeve 21 is halfway between the two marks on the conduit 11. After the coupling has been centered, the joint is completed by welding the ends of the sleeves 21 and 22 at W4 and W5, respectively, to the conduits 11 and 12 and entirely therearound.

It is to be noted that when the coupling 10 is centered between the two conduits 11 and 12, the conduit 11 extends well past the space 25 between the diaphragm plates 13 and 14, and, consequently, forms an inner sleeve spanning the space 25 and provides a relatively long, thin, annular passage 26 between the sleeve 22 and the conduit 11 which resists the ingress of any dirt, sediment or other foreign matter to the space 25 between the plates 13 and 14. Moreover, the telescopic relation between the extended conduit 11 and the sleeve 22 tends to prevent any appreciable sidewise or transverse displacement of the conduits and enhances the alignment thereof. Further the flexible diaphragm plates 13 and 14 permit vibration, elongation, and contraction of the conduits without affecting the tightness of the coupling.

Figure 3:
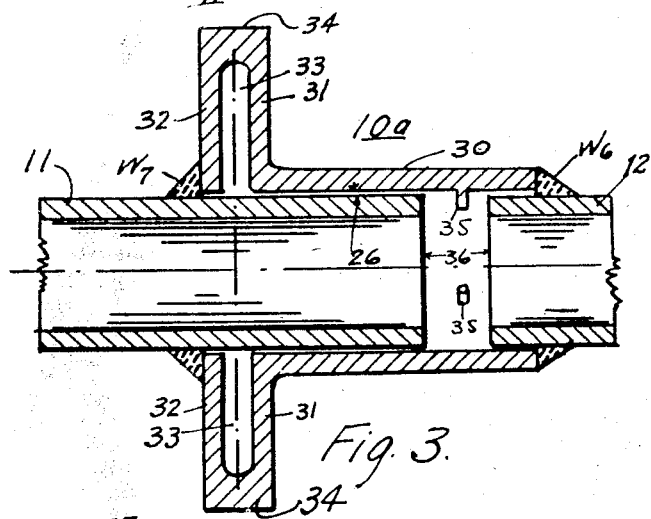
Fig. 3 is a longitudinal section of a coupling illustrating another exemplification of my invention.

Fig. 3 illustrates another exemplification of my invention in which the expansible coupling 10a is made from a single or unitary piece of metal either by forging a single piece of stock or by milling the flange of a standard flange coupling, such as a half of a standard Van Stone flange coupling, to provide the flexible diaphragm plates. As illustrated, the coupling 10a comprises a sleeve 30 having at one end thereof, two unitarily formed annular members 31—32 to provide the diaphragm plates of the coupling. The plates 31—32 are separated by the space 33 and are connected together at their outer edges by a member 34 formed integrally with the sleeve 30 and plates 31 and 32. The coupling 10a is applied to the conduits 11 and 12 in the manner heretofore described in connection with the coupling 10 shown in Figs. 1 and 2, and lugs 35 are provided on the inner surface of the sleeve 30 for centering the coupling in the space 36 formed between the ends of the conduits 11 and 12. After the coupling 10a is in proper position on the conduits 11 and 12, the end of the sleeve 30 is welded at W6 to the conduit 12 and the inner edge of the plate 32 is welded at W7 to the conduit 11.

Figure 4:
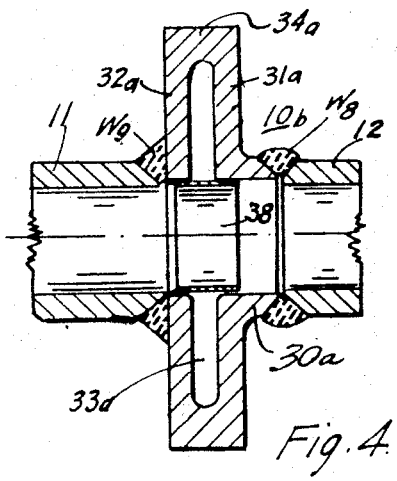
Fig. 4 is a longitudinal section of a slightly modified form of flexible coupling and illustrates another mode of attaching the coupling to the conduits.

Fig. 4 illustrates a coupling 10b similar in all substantial details to the coupling 10a shown in Fig. 3 and differs therefrom primarily in the method of mounting the coupling on the conduits. In this exemplification, the coupling, instead of being in telescopic relation with the conduits 11 and 12, is mounted between the ends of the conduits in abutting relation therewith and the sleeve 30a, which is relatively short in the present modification and the diaphragm plate 22a, are welded at W8 and W9 to the ends of the conduits. An internal sleeve 38 is attached to the diaphragm plate 32a and extends underneath the diaphragm plate 31a into the sleeve 30a covering the slace 33a between the diaphragm plates 31a—32a. This sleeve 38 while resisting the ingress of dirt and other sediment into the space 33a does not interfere with the flexibility of the coupling since it is attached only at one end and only to the plate 32a.

Figure 5:
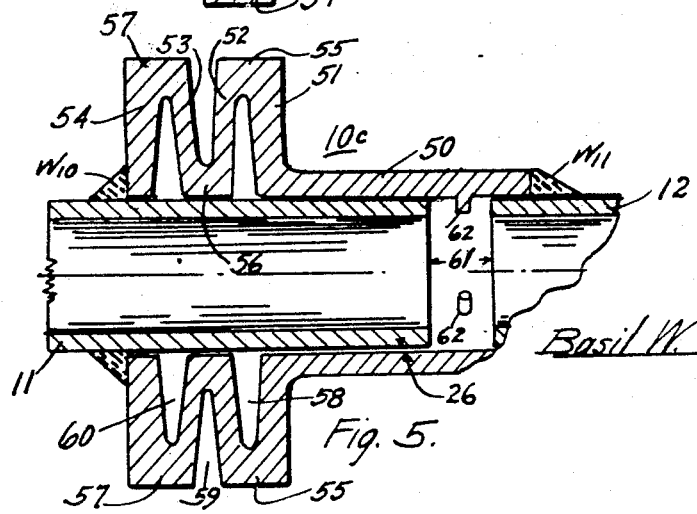
Fig. 5 is a longitudinal section of a coupling illustrating another modification of my invention in which multiple diaphragm plates are provided.

In Fig. 5 I have illustrated a modified form of coupling designated as 10c which involves a unitary structure similar to Fig. 3 having multiple diaphragm plates. In this modification, the coupling 10c which may be formed by milling or grooving a standard flange coupling, such as half of a Van Stone flange coupling, or by forging a suitable piece of stock, comprises a sleeve portion 50 having at one end thereof a series of connected annular plates 51—52—53—54 forming the diaphragm plates of the coupling. The outer edge of the plate 51 is connected by a portion 55 to the outer edge of the plate 52 whose inner edge is connected by the portion 56 to the inner edge of the plate 53, which, in turn, at its outer edge is connected to the outer edge of plate 54 by the portion 57. Spaces 58—59—60 are provided between the adjacent faces of plates 51—52, 52—53 and 53—54, respectively. The coupling 10c is adapted to telescope over the ends of the conduits 11 and 12 and is centered in the space 61 between the ends of the conduits 11 and 12 by means of lugs 62 on the inner surface of the sleeve 50. When the multiple plate coupling 10c has been centered in proper position on the conduits 11 and 12, it is secured in position thereon by welding the diaphragm plate 54 at W10 to the conduit 11 continuously around its outer surface, and welding the end of the sleeve 50 at W11 to the conduit 12 in a similar manner. It is to be noted that the diaphragm plates 51—54, that is, the outside walls of the diaphragm, are made thicker or heavier than the plates 52—53 to protect the coupling from blowing out. As in the previous modification, the end of the conduit 11 closes the spaces 58—60 and extends a sufficient distance into the sleeve 50 to prevent the dirt or other sediment from passing through the annular passage 26 into the bellows chambers 58—60.

While, as heretofore stated, the coupling 10c may be made in any suitable manner, such as forging and forming, I prefer to fabricate the same from a standard flange coupling by internally milling or grooving the flange portion thereof to provide the spaces 58—60 to form the diaphragm plates 51—54 and externally milling or grooving the flange at a point midway between the centers of the internal spaces 58—60, to produce the space 59 and to form the outer faces of the diaphragm plates 52—53. I prefer to have the slots or spaces 58—59—60 taper from the inner edge of the flange to provide the heaviest edges toward the outer periphery thereof, thereby forming, in effect, a cantilever beam of the end plates 51—52—53—54 having a uniformly strong section with the load concentrated and applied at the inner edge by the ends of the conduits.

From the foregoing, it is apparent that I have produced a flexible coupling for joining the ends of conduits which is simple and efficient and by using relatively large and heavy diaphragm plates, a coupling of such rigid construction is produced that it is amply strong at the point of greatest strain to take without injury all possible strains imposed on the coupling. It is to be observed that in all forms of the coupling described herein, provision has been made to seal out sediment from the bellows chamber and to provide sleeve guides which prevent the majority of the piping strains from being transmitted directly to the flexible diaphragm plates of the coupling.

Further, since the diaphragm plates can be made from stainless steel or other rust-resisting metal having high fatigue limits, the couplings have a degree of permanency heretofore unapproached in the art. Being easily cut or punched from stock material, the plates are inexpensive and can be produced economically by simple plant equipment. The couplings can be made in any desired size and by use of multiple diaphragm plates any reasonable extent of movement can be obtained. Couplings of this character can be readily installed in the field in much the same manner as ordinary pipe couplings and when once installed there are no gaskets or rubber washers to be inspected or renewed. Thus, the maintenance expense is negligible. The couplings of this invention permit the conduits to approach one another, to separate, and to tilt. Vibration, expansion, contraction, shifting soil, etc. will not lessen the flexibility nor adversely affect the permanent tightness of the couplings.

While I have illustrated a few exemplifications of my invention, it is to be understood that I do not desire to limit myself to the particular constructions disclosed but that certain modifications, additions, changes, omissions and the like may be made therein without departing from the spirit of my invention or the scope of my appended claims.

What I claim as new and desire to secure by Letters Patent is:

1. A flexible coupling for connecting two conduits comprising a sleeve adapted to fit over the ends of both conduits and to be secured to one of them, and an annular flange at one end of said sleeve and secured to the other of said conduits and having at least one tapered groove formed therein to divide the flange into flexible diaphragm plates having their heaviest edges toward their outer peripheries.

2. A flexible coupling for connecting two conduits comprising in combination, a sleeve adapted to fit over the ends of both of said conduits and to be attached to one conduit end, an annular flange integral with one end of said sleeve and attached to the other conduit end and having at least one internal groove therein to provide a bellows chamber, and positioning lugs on the internal surface of said sleeve and spaced substantially from said grooved flange, whereby the bellows chamber is covered and protected by one conduit end when the coupling is in use.

3. A flexible coupling comprising a cylindrical sleeve adapted to receive a smooth cylindrical conduit in each end thereof and only slightly larger in internal diameter than the external diameter of said conduits, an enlarged annular flange at one terminus of said sleeve and internally and externally grooved to provide a plurality of diaphragm plates connected in series, the other terminus of said sleeve and the radially innermost portion of the last plate being adapted to be directly and permanently attached to such conduits.

4. A flexible coupling comprising a cylindrical sleeve adapted to receive a smooth cylindrical conduit in each end thereof and only slightly larger in internal diameter than the external diameter of said conduits, an enlarged annular flange at one terminus of said sleeve and internally and externally grooved to provide a plurality of diaphragm plates connected in series, the other terminus of said sleeve and the radially innermost portion of the last plate being adapted to be directly and permanently attached to such conduits, said sleeve being provided on its inner surface with a plurality of spaced upstanding lugs extending radially part way toward the sleeve center.

5. A flexible coupling comprising a cylindrical sleeve adapted to receive a smooth cylindrical conduit in each end thereof and only slightly larger in internal diameter than the external diameter of said conduits, an enlarged annular flange at one terminus of said sleeve and internally grooved to provide a plurality of diaphragm plates connected in series and having the points of maximum strength radially remote from the sleeve, the other terminus of said sleeve and the radially innermost portion of the last plate being adapted to be directly and permanently attached to such conduits, said sleeve being provided on its inner surface with a plurality of spaced upstanding lugs extending radially part way toward the sleeve center and being asymmetrically disposed with respect to the transverse center line of such sleeve.

6. A flexible coupling comprising a cylindrical sleeve adapted to receive a smooth cylindrical conduit in each end thereof and only slightly larger in internal diameter than the external diameter of said conduits, an enlarged annular flange at one terminus of said sleeve and internally grooved to provide a plurality of diaphragm plates connected in series and having the points of maximum strength radially remote from the sleeve, the other terminus of said sleeve and the radially innermost portion of the last plate being adapted to be directly and permanently attached to such conduits, said sleeve being provided on its inner surface with a plurality of spaced upstanding lugs extending radially part way toward the sleeve center and being disposed nearer to the unflanged terminus of said sleeve than to the flanged terminus.

BASIL W. DENNIS.